US 6,676,225 B1

(12) United States Patent
Baxter

(10) Patent No.: US 6,676,225 B1
(45) Date of Patent: Jan. 13, 2004

(54) SPOKE CLIP

(76) Inventor: Robert D. Baxter, 220 Hummingbird Rd., Morrisdale, PA (US) 16858

( * ) Notice: Subject to any disclaimer, the term of this patent is extended or adjusted under 35 U.S.C. 154(b) by 0 days.

(21) Appl. No.: 10/248,842

(22) Filed: Feb. 24, 2003

(51) Int. Cl.[7] .................................................. B60B 7/06
(52) U.S. Cl. .................... 301/37.41; 280/288.4
(58) Field of Search ........................... 301/37.41, 55, 301/60, 61, 64.704, 70, 73, 75, 81, 83, 104; 428/31; 280/288.4; 40/660

(56) References Cited

U.S. PATENT DOCUMENTS 3,879,089 A * 4/1975 Stults et al. ............. 301/37.41
3,967,879 A * 7/1976 Tsuyama ................. 301/37.41
3,995,938 A * 12/1976 Olson ...................... 301/37.41
4,037,924 A * 7/1977 May ........................ 301/37.41
4,202,582 A * 5/1980 Seltman ................... 301/37.41
4,910,053 A * 3/1990 McDonald et al. ........... 428/31
6,339,323 B1 * 1/2002 Muraoka ................. 301/37.41

* cited by examiner

Primary Examiner—S. Joseph Morano
Assistant Examiner—Jason R. Bellinger
(74) Attorney, Agent, or Firm—John J. Elnitski, Jr.

(57) ABSTRACT

A spoke clip including a plate, spoke channel and at least two tie holes. The plate includes a front face, back face, sides, top and bottom. The sides of the plate define the thickness of the plate. The thickness being thin enough to allow the plate to fit between two spokes which cross each other. The spoke channel is part of the back face to receive a spoke of a wheel. The least two tie holes are through the front and back faces.

12 Claims, 10 Drawing Sheets

SPOKE CLIP

BACKGROUND OF INVENTION

The present invention generally relates to the prevention of spokes of a wheel from loosening during rotation of the wheel. More specifically, the present invention relates to a device strapped to spokes of a wheel of a vehicle such as a motorcycle to prevent loosening of the spokes during rotation of the wheel.

Vehicles with spoked wheels, particularly motorcycles, have a problem with loosening of the individual spokes. The loosening occurs due to wheel rotation and vibration of the wheel during wheel rotation. What is needed is a means to prevent loosening of the spokes during rotation of the wheel.

It is an object of the present invention to provide a device strapped to spokes of a wheel of a vehicle to prevent loosening of the spokes during rotation of the wheel.

SUMMARY OF INVENTION

A spoke clip including a plate, spoke channel and at least two tie holes. The plate includes a front face, back face, sides, top and bottom. The sides of the plate define the thickness of the plate. The thickness being thin enough to allow the plate to fit between two spokes which cross each other. The spoke channel is part of the back face to receive a spoke of a wheel. The least two tie holes are through the front and back faces.

DETAILED DESCRIPTION

Figure 1:
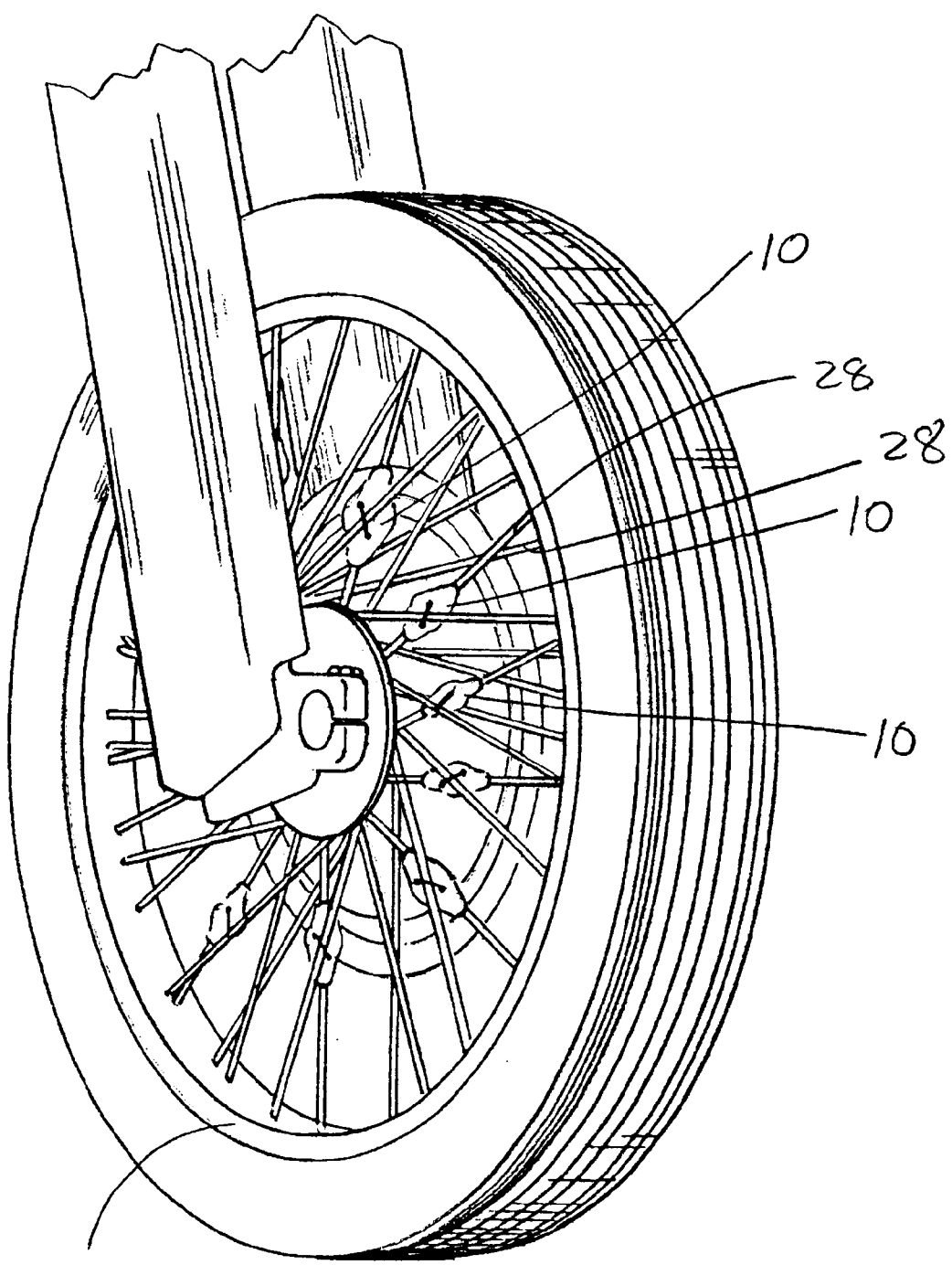
FIG. 1 a perspective view of a spoke clip on a spoked wheel according to the present invention.
Figure 2:
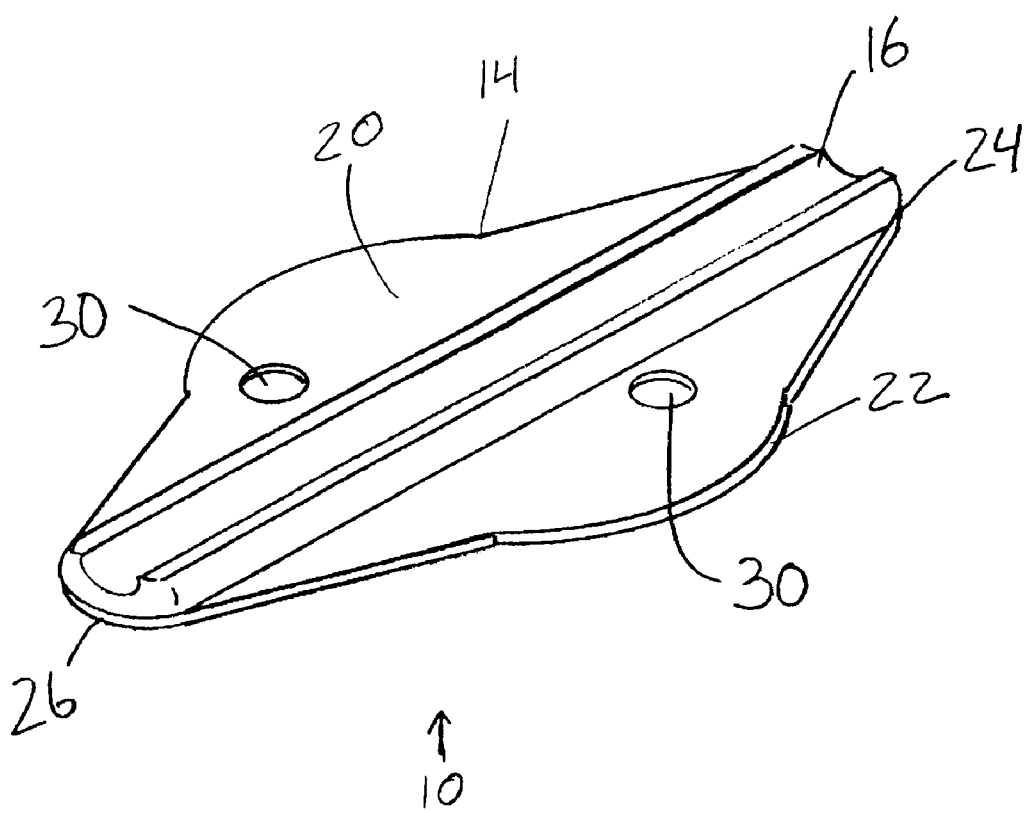
FIG. 2 is a perspective rear view of a spoke clip according to the present invention.
Figure 3:
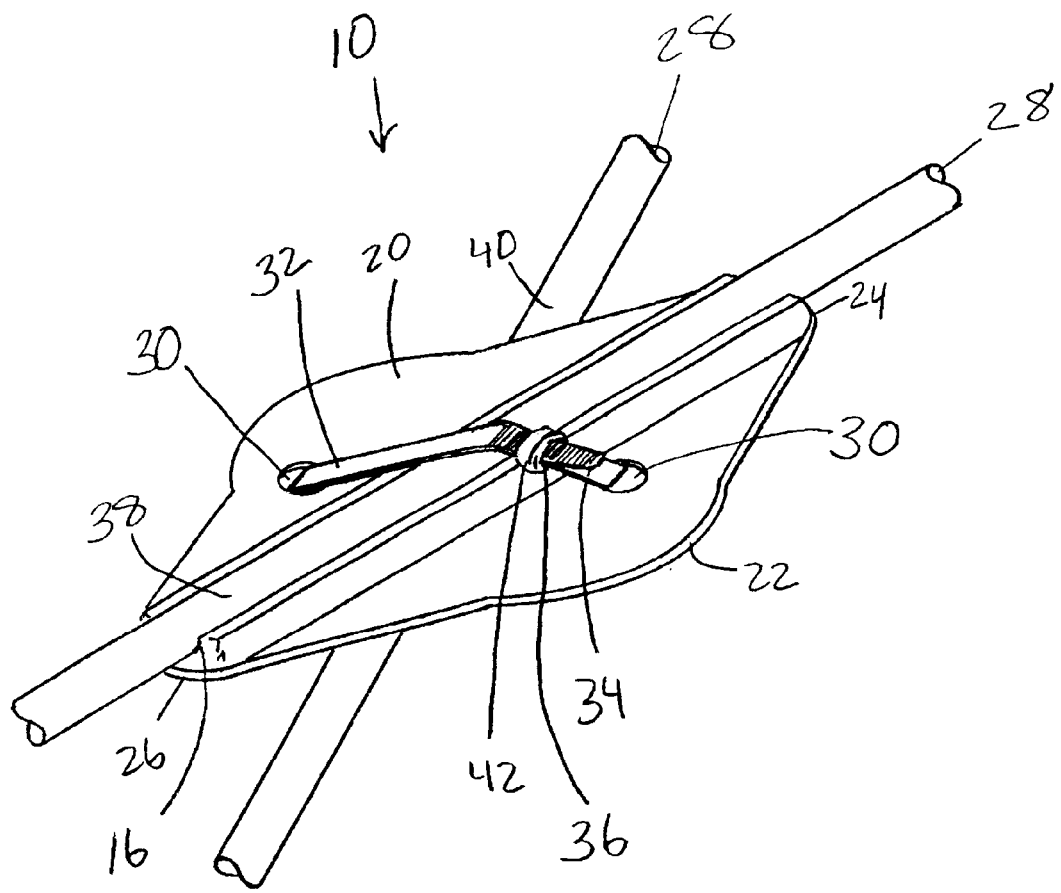
FIG. 3 is a perspective rear view of a spoke clip attached to two spokes according to the present invention.
Figure 4:
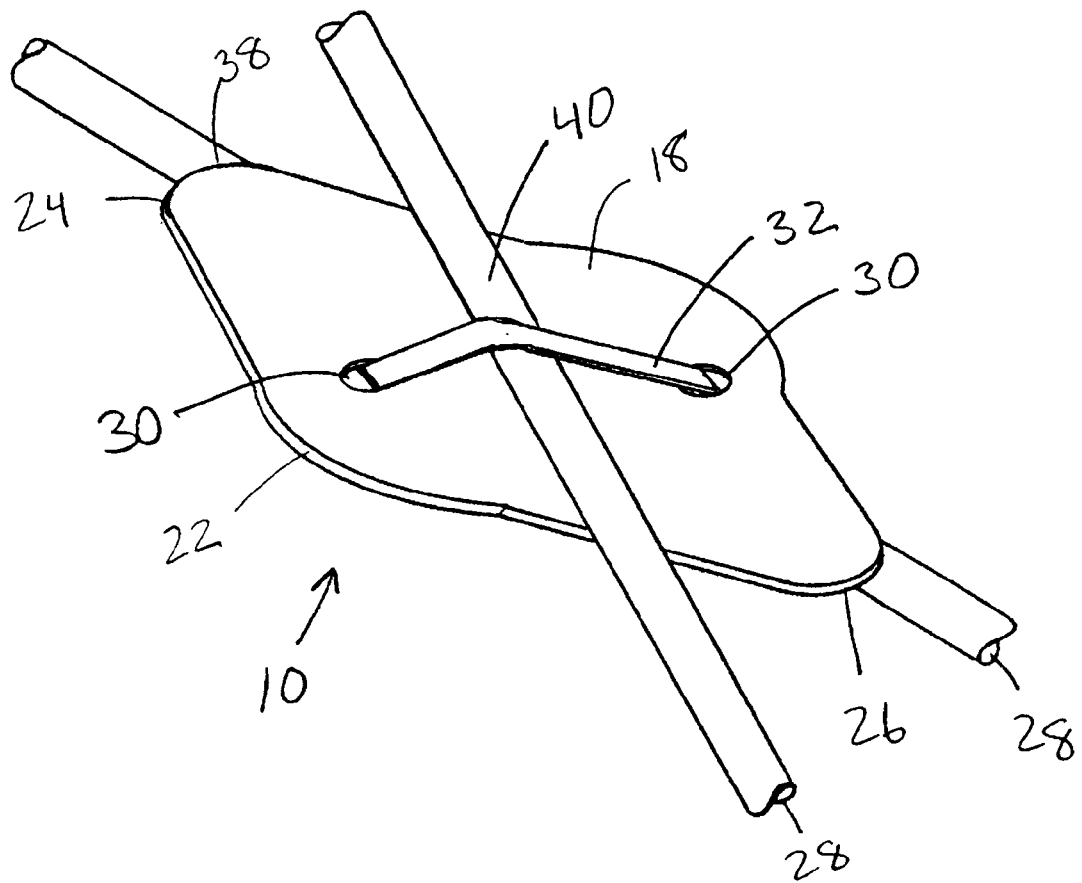
FIG. 4 is a perspective front view of a spoke clip attached to two spokes according to the present invention.
Figure 5:
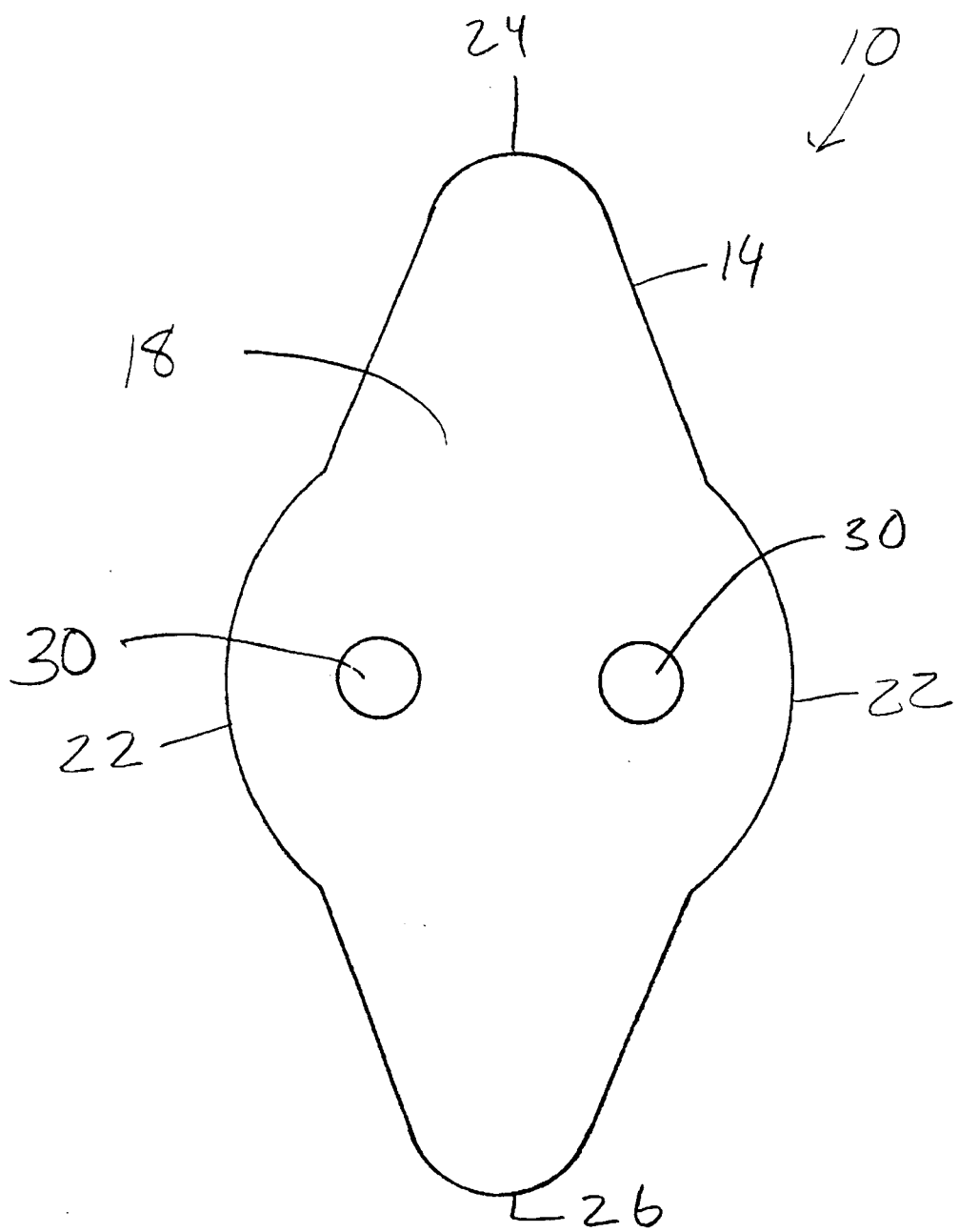
FIG. 5 is a front view of a spoke clip according to the present invention.
Figure 6:
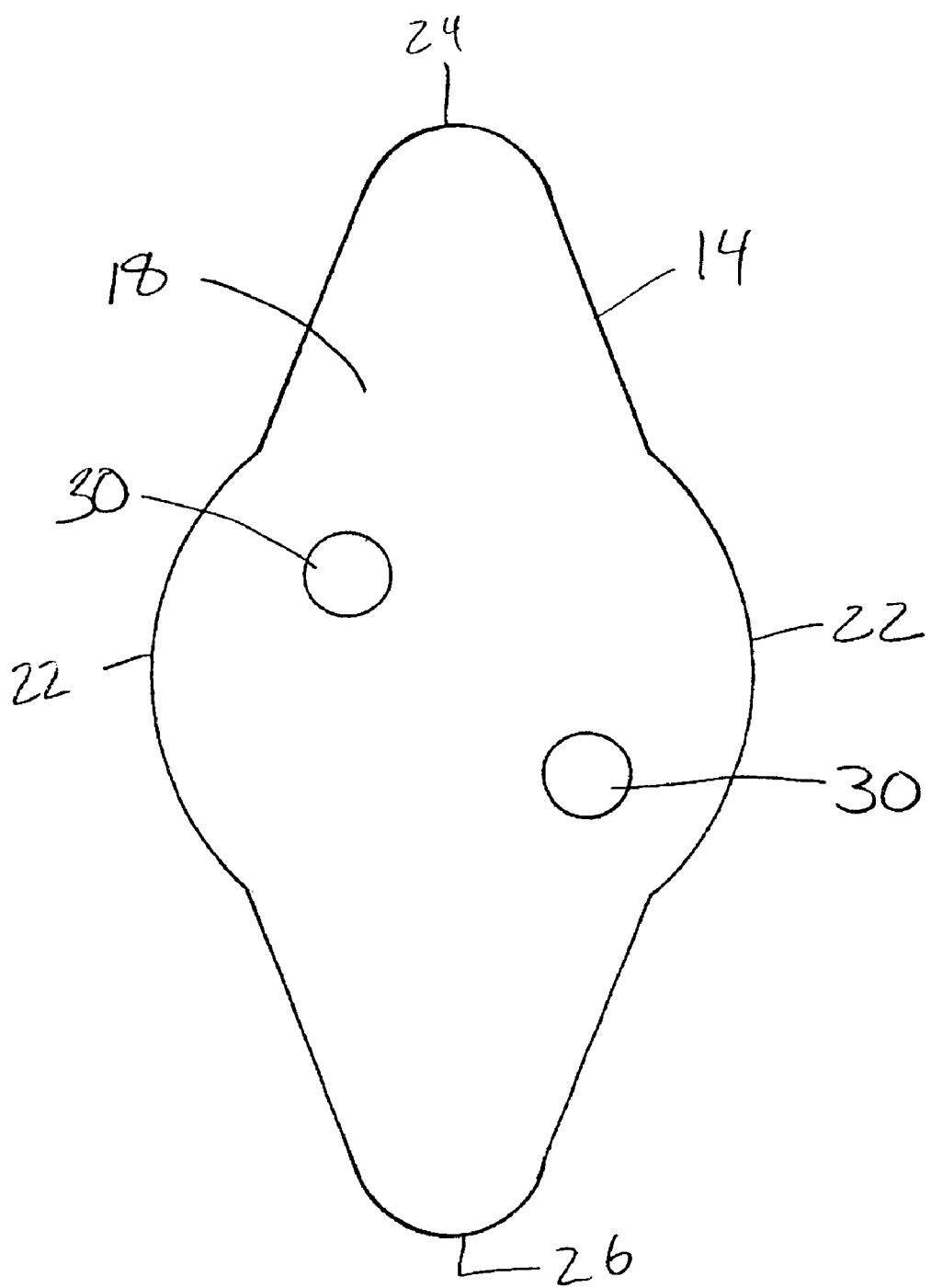
FIG. 6 is a front view of a spoke clip according to the present invention.
Figure 7:
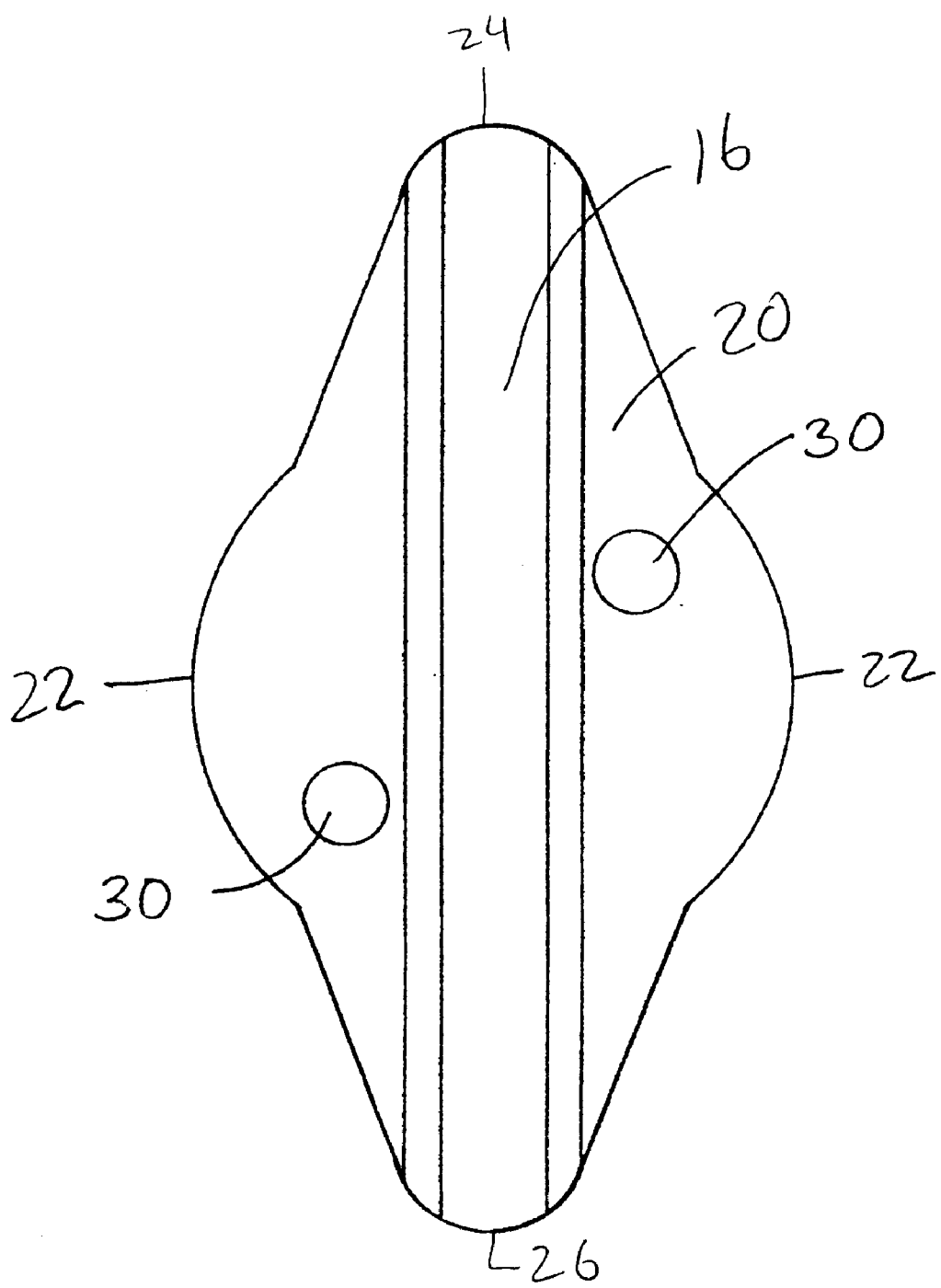
FIG. 7 is a rear view of a spoke clip according to the present invention.
Figure 8:
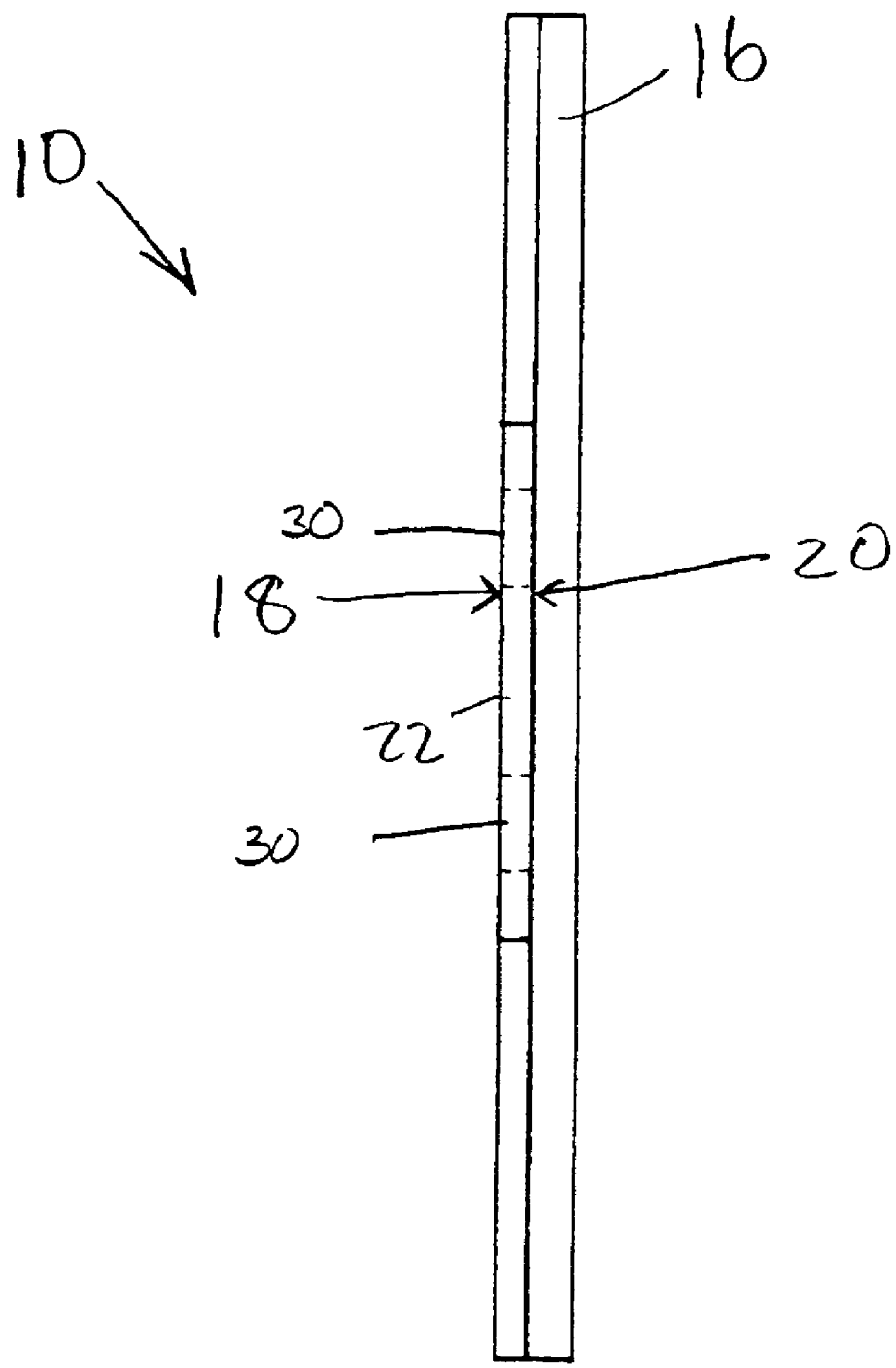
FIG. 8 is a side view of a spoke clip according to the present invention.
Figure 9:
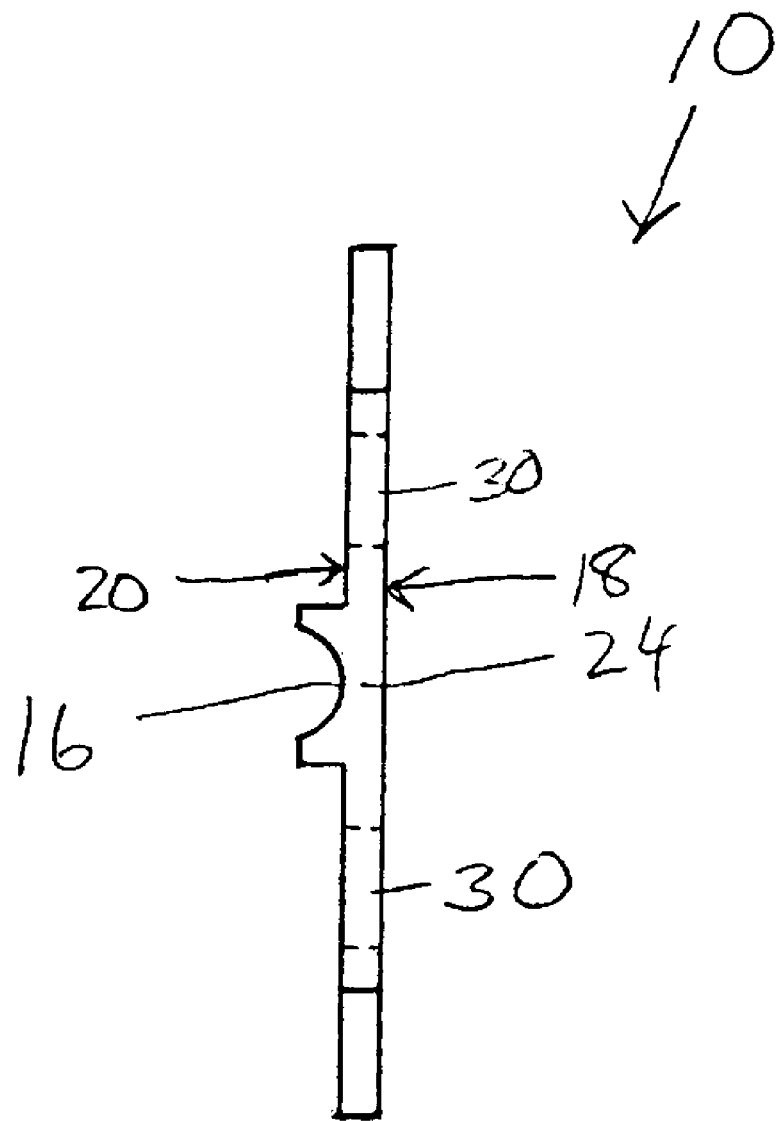
FIG. 9 is a top view of a spoke clip according to the present invention.
Figure 10:
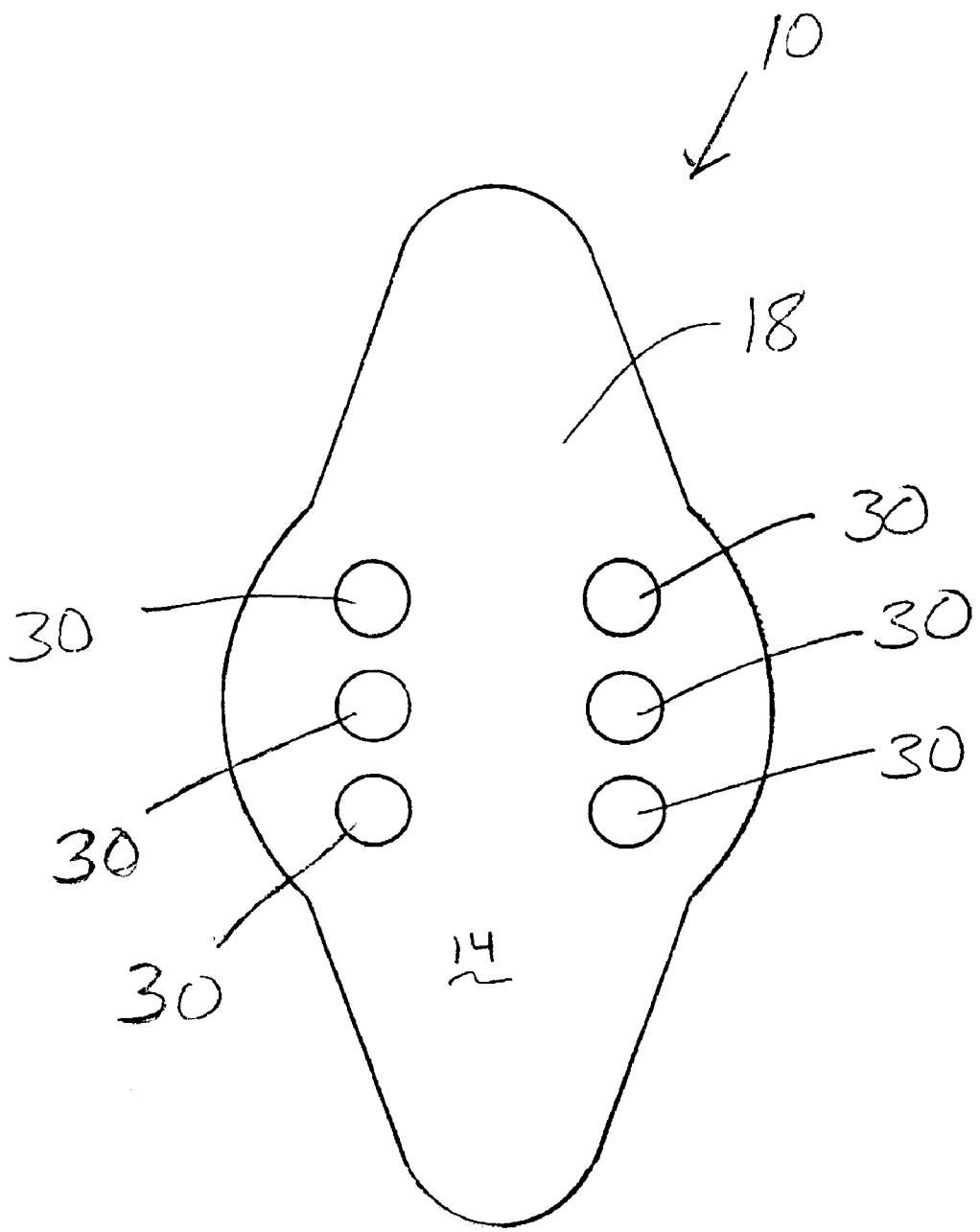
FIG. 10 is a front view of a spoke clip according to the present invention.

The present invention is a spoke clip 10, as shown in FIGS. 1–10. FIG. 1 shows the spoke clip 10 on a spoked wheel 12. The spoke clip 10 is a plate 14 with a spoke channel 16, as shown in FIG. 2. The plate 14 is a flat planer surface having a front face 18, back face 20, sides 22, top 24 and bottom 26, as shown in FIGS. 2–9. The sides 22 define the thickness of the plate 14 and should be thin enough to allow the plate 14 to fit between two spokes 28 which cross each other. The spoke clip 10 includes at least two tie holes 30 through the front face 18 and back face 20. FIG. 10 shows a spoke clip 10 with more than two tie holes 30. The spoke channel 16 is shown as part of the back face 20 of the spoke clip 10. The spoke channel 16 is shown as an open U-shape. The spoke clip 10 also includes a tie 32, as shown in FIGS. 3–4. The tie 32 has a first end 34 and a second end 36.

The use of the spoke clip 10 is as follows. The spoke clip 10 is placed between two spokes 28 of a wheel 12 where the two spokes 28 cross each other, as shown in FIGS. 1, and 3–4. Of the two spokes 28, there is an inside spoke 38 and an outside spoke 40. The spoke clip 10 is placed with the front face 18 of the spoke clip 10 facing out from the wheel 12. The spoke clip 10 is placed such that inside spoke 38 of the two spokes 28 rests in the spoke channel 16 and the outside spoke 40 rest against the front face 18. The first end tie 34 of the tie 32 is inserted into one of the tie holes 30 from the back face 20. Next, the tie 32 is wrapped around the outside spoke 40 and the first end 34 of the tie 32 is inserted into the other tie hole 30. The first end 34 of the tie 32 is then attached to the second end 36 of the tie 32 and tighten against the inside spoke 38. Tightening the tie 32 against the inside spoke 38 pulls the inside spoke 38, the spoke clip 10 and outside spoke 40 together. This arrangement aids in restricting the two spokes 28 from rotating loose due to wheel rotation and wheel vibration. The tie 32 can be of the variety of what is know as a zip tie having one of the ends that includes a receiver 42 to hold the first end 34 of the tie 32, as shown in FIG. 3. The combination of the tie 32 and the spoke clip 10 not only helps to hold the spokes 28 in place, but absorbs some of vibration transmitted from the tires of the wheel 12 to the spokes 28 of the wheel 12. The spoke clip 10 shown in FIG. 10 includes additional ties holes 30 to allow the user to choose which two tie holes 30 to use. Also, the spoke clip 10 shown in FIG. 10 allows the user to more than one tie 32, as two pair of tie holes 30 could be used with one tie 32 for each pair of available tie holes 30.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A spoke clip comprising:

a plate, said plate having a front face, back face, sides, top and bottom, said sides of said plate defining a thickness of said plate, said thickness being thin enough to allow said plate to fit between two spokes which cross each other;

a spoke channel as part of said back face to receive a spoke of a wheel; and at least two tie holes through said front and back faces, said tie holes positioned on said plate such that placement of said plate with said spoke channel resting about one of the two crossed spokes and with said front face of said plate behind the other of the crossed spokes allows the use of at least one tie to pass through said tie holes and wrap around both crossed spokes near a crossing point of the crossed spokes to prevent rotation of the crossed spokes.

2. The spoke clip of claim 1, further including a tie to use with said tie holes.

3. The spoke clip of claim 2, wherein said tie has two ends and wherein one end includes a receiver to receive said other end to allow tightening of said tie.

4. The spoke clip of claim 1, wherein said spoke clip includes more than two tie holes.

5. The spoke clip of claim 4, further including a tie to use with said tie holes.

6. The spoke clip of claim 5, wherein said lie has two ends and wherein one end includes a receiver to receive said other end to allow tightening of said tie.

7. The spoke clip of claim 1, wherein the spoke channel is an open U-shape.

8. The spoke clip of claim 2, wherein the spoke channel is an open U-shape.

9. The spoke clip of claim 3, wherein the spoke channel is an open U-shape.

10. The spoke clip of claim 4, wherein the spoke channel is an open U-shape.

11. The spoke clip of claim 5, wherein the spoke channel is an open U-shape.

12. The spoke clip of claim 6, wherein the spoke channel is an open U-shape.

* * * * *